Nov. 5, 1963        R. C. WICKER ETAL        3,109,239
                    SCREEN ANGLE INDICATOR
                    Filed Sept. 12, 1960
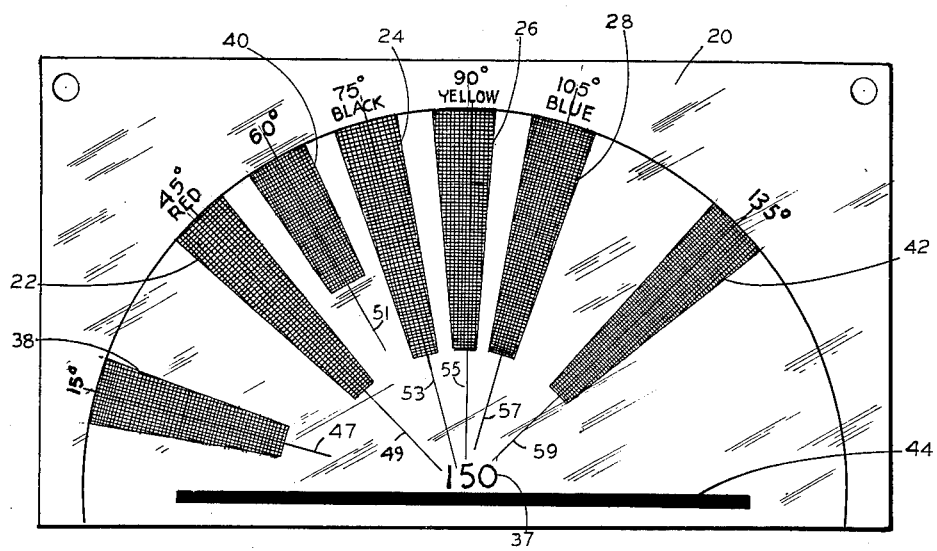
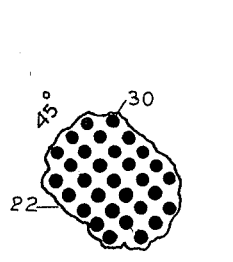
FIG. 2
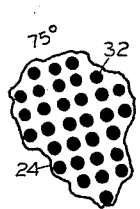
FIG. 3
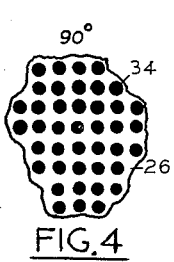
FIG. 4
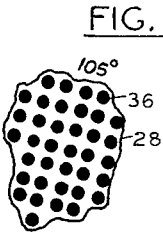
FIG. 5
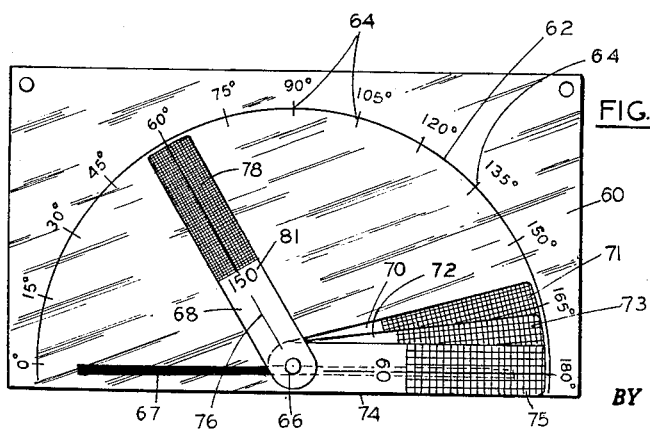
INVENTORS
RALPH C. WICKER
WALTER R. SHAUGHNESSY
BY
ATTORNEY

United States Patent Office 3,109,239
Patented Nov. 5, 1963

3,109,239
SCREEN ANGLE INDICATOR
Ralph C. Wicker, Penfield, N.Y. (68 Hill Ave., Yalesville, Conn.), and Walter R. Shaughnessy, Rochester, N.Y.; said Shaughnessy assignor to said Wicker
Filed Sept. 12, 1960, Ser. No. 55,460
8 Claims. (Cl. 33—1)

This invention relates to color lithographic work and more particularly to a protractor-like indicator for determining the angular disposition and spacing of the rows of dots in half tone negatives used in color lithography.

In conventional multicolor photo lithographic work, a set of screens are employed, wherein the angular disposition of the half tone dots is varied for the different screen colors. In a set of four screens, one for black, one for blue, one for red, and one for yellow, it is the practice, for example to employ dots disposed on lines 75°, 105°, 45° and 90°, from the horizontal, the dots, while varying in intensity, all have the same pitch in any one set of screens, as for example 60, 120, 133 or 150 to the inch depending on the degree of refinement desired. The angular arrangement between red, blue and black is so chosen as to minimize interference patterns, and an angle of 30° between the red, blue and black screens is used in general practice, with the yellow screen disposed at an angle of 15° from the black and blue because of its lesser tendency to cause interference patterns. It has been the practice of lithographers to employ a relatively powerful magnifying glass to examine and determine the angular relation of the dots on screens, in the form of negatives, and proofs in order to determine the color such screen or proof is intended for.

Such practice results in eye strain, and is relatively slow.

The present invention is directed to a protractor like device of transparent film, which is provided with four regions of half tone dots of uniform intensity and spacing, each area having the dots disposed in lines or rows at right angles, the lines of these four different color areas being at four different angles, in correspondence with the angular disposition of the dots, on black, blue, red and yellow screens. The regions are marked with suitable legends such as Red, Black, Yellow and Blue to correspond to a particular system in common use with the spacing of the dots, as for example if 150 to the inch, being also indicated.

By disposing one by one the various regions of the protractor over a negative or positive screen in which the angular disposition of the dots and the corresponding color, is in question, an operator may quickly determine the angular disposition of the dots of a screen, since the region having dots corresponding in angle to the dots in the screen in question will at once align and overlie one another, and all interference patterns will promptly disappear, and the observation is made without requiring microscopic examination. Any slight deviation from alignment produces an interference pattern readily observable with the naked eye, the interference pattern taking on a checkerboard effect, the black and white squares of which diminish from large size to ever decreasing size, as the angle of disalignment increases. The interference pattern is on a scale sufficiently large to be seen by the naked eye, without resort to magnification when the disalignment is not greater than five degrees, and once the pattern appears, the angle of disalignment is quickly indicated by relative rotation between the protractor and screen, whereby the pattern enlarges or decreases, enlargement indicating that alignment is being approached.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings wherein like reference characters indicate like parts:

FIGURE 1 is a plan view of the protractor;

FIGURE 2 is a greatly enlarged fragmentary plan view of a portion of the 45 degree shaded region of FIGURE 1;

FIGURE 3 is a greatly enlarged fragmentary plan view of a portion of the 75 degree shaded region of FIGURE 1;

FIGURE 4 is a greatly enlarged fragmentary plan view of a portion of the 90 degree shaded region of FIGURE 1;

FIGURE 5 is a greatly enlarged fragmentary plan view of a portion of the 105 degree shaded region of FIGURE 1; and FIGURE 6 is a modified form of protraction.

Referring to the drawings, there is shown a transparent plastic sheet 20 of the type employed for photographic negatives upon which has been imprinted in four regions 22, 24, 26 and 28, a series of equally spaced dots spaced in correspondence with the dots employed in half tone color lithographing. In the region marked "45°, Red," region 22, the dots which are jet black or opaque, are uniformly spaced and aligned at an angle of 45° and 135° from the base line 44, and the dots 30 under magnification appear substantially in the manner shown in FIGURE 2.

In the region marked "75°, Black," region 24, the dots are disposed on lines extending 75° and 165° from the base line 44, and the dots 32 under magnification appear in the manner shown in FIGURE 3.

In the region marked "90°, Yellow," region 26, the dots are disposed in lines extending 90°, and 180° or parallel with and at right angles to base line 44, and the dots 34 under magnification appear in the manner shown in FIGURE 4.

In the region marked "105°, Blue," region 28, the dots are disposed on lines extending 105° and 15° from the base line 44, and under magnification the dots 36 appear in the manner shown in FIGURE 5.

The protractor shown is marked as at 37 with the legend "150," which signifies to the user, that the spacing between all of the dots in the regions 22, 24, 26 and 28, are 150 to the inch, when measured along the lines on which the dots are disposed, and such a protractor would be used in conjunction with color half tone printing employing screen sizes wherein the dots are of a frequency of 150 to the inch, and wherein the red screen employs dots arranged on a 45° angle, the black screen employs dots disposed on lines at a 75° angle, the yellow dots on lines disposed on lines at a 90° angle and the blue dots on lines disposed on lines at a 105° angle.

Additional regions as at 38, 40 and 42, may be provided at 15°, 60° and 135°. In the region 38, the dots, of the same size and spacing as in the regions 22, 24, 26 and 28, will be disposed on lines extending 15° and 105° from the base line 44. In the region 40, the dots will be of the same size and spacing as in the regions 22–28 inclusive, but are disposed on lines 60° and 150° from the base line 44. In the region 42, the dots will likewise be of the same size and spacing as in regions 22–28 inclusive, but are disposed on lines 135° and 45° from the base line 44. Each of the regions will preferably be provided with center lines such as 47, 49, 51, 53, 55, 57 and 59 which will extend at angles to the base line 44, as indicated.

The spacing of the dots has been described as 150 to the inch, and the protractor thus described is provided with indicia so indicating, as at 37, and the protractor thus described is for use in conjunction with color screens employing a dot frequency of 150 to the inch. Similar protractors may be provided for use in conjunction with color screens having dot spacings such as 133, or 120, or 60 to the inch, the difference between each of such protractors and that described, being merely in the actual spacing of the dots within the regions 22, 24, 26, 28, 38, 40 and 42, the dot spacings being all alike in any one protractor, and that spacing being indicated by a number such as 133, 120 or 60, to indicate the number of dots to the inch, of the particular protractor, and such number being used in place of the number 150 at 37, of the protractor described in FIGURE 1.

Depending upon the refinement of the color lithography desired, the dot frequency in practice may be 150 to the inch, if a high degree of refinement is desired. In practice lesser frequencies are employed, such as 133 to the inch, 120 to the inch, or even as low as 60 to the inch, the spaces set forth being standard spacings as employed in the industry. In order to provide a protractor that may be generally applicable to different standard dot spacings, there is shown in FIGURE 6 a device wherein the protractor proper 60, of transparent plastic, instead of having microscopically dotted regions such as 22, 24, 26, 28, 38, 40 and 42 imprinted directly thereon at fixed angles as in FIGURE 1, is provided with a semicircular scale 62 marked at 15 degree intervals with graduation lines as at 64. At the center of the scale, 66, and on the base line 67 there are pivotly secured a number of transparent indicating arms, such as 68, 70, 72 and 74. The arm 68, has a radially extending center line 76, adapted to be aligned with the graduation lines 64, at the angles indicated. The arm also has an imprinted region 78, wherein black dots are disposed with uniform spacing along lines parallel with and at right angles to the center line 76, thereto, the dots being spaced at a frequency of 150 to the inch to correspond to the number 150 appearing thereon, as at 81 conforming to that illustrated in FIGURE 2 for example. The dots in the regions 71, 73 and 75, of arms 70, 72 and 74 are also uniformly spaced at 133, 120, and 60 to the inch respectively, and disposed on lines parallel to, and at right angles to the center line 76 of each such arm. In a system wherein the dot pitch is 150 to the inch and the red screen has the dots disposed at 45°, the black screen at 75°, the blue screen at 105°, and the yellow screen at 90°, the swinging of the arm 68 from one position to the other over a particular screen in question will enable the user to quickly identify the exact angle by eye observation of the gradual enlargement of the checkerboard interference pattern, as alignment is approached, and the disappearance of the dots of such screen interference when exact alignment is reached.

Each of the other screens of a set may be similarly tested by laying the protractor over each screen, with base line 67 aligned parallel with the lower edge of the screen, and by thereafter swinging the arm 68 through an angle of not more than ninety degrees, until the eye observation of the checkerboard interference pattern is noted, following which exact alignment is effected, whereupon the center line 76 indicates on the scale 62 the angle of the dots of the screen being observed.

In a similar manner the arms 70 or 72 or 74 provided with regions 71, 73 and 75 of dots uniformly spaced at 133 to the inch, 120 to the inch and 60 to the inch respectively may be employed for identifying screens, and their angles. With the protractor of FIGURE 6 the user may employ the particular arm such as 68 which corresponds to the dot spacing of the set of color screens which are to be examined, for the angle of the color dots on each screen, the remaining arms such as 70, 72 and 74 being disposed to one side, out of the way.

The relative weight of the dots, that is the portion of the entire area that is black as compared to the entire area, is preferably chosen at about 40%, thus leaving 60% of the region clear. When the protractor as in FIGURE 1, or an arm of the protractor of FIGURE 6, is disposed over a color screen, having the same dot frequency as that of the dot area used for observation, if the dots, in the protractor area, or dot area of the arm, are aligned with the dots of the screen, all evidence of the dots will disappear. As the protractor dot area is rotated a degree to one side or the other out of alignment with the alignment of the dots of the color screen being observed, large visible dots with corresponding large visible spacings with a somewhat checkerboard effect will first appear, and as the out of alignment angle is further increased, the apparent visible dots or checkerboard effect will decrease in size and spacing.

What the observer actually sees is an interference pattern by reason of the out of alignment angle, but when true alignment prevails, the dots of the protractor area conform precisely with the alignment of the screen, and thus completely disppear, and when this is observed, the operator is thus informed of the exact angle at which the screen dots are disposed.

The indicator may be employed to identify the colors present in previously printed color printed matter, and to determine the angles at which the colors red, blue, black and yellow are disposed. In other words, the indicator may be used to identify the angle system employed in colored printed matter, so that if reproduction is desired, a set of color screens using the same angles can be employed. In addition the indicator may be employed to quickly check the negatives or positives of any four color printing process employing such negative and positive screens.

The indicator may further be employed to check single color proof sheets to ascertain and check the angle. Further the indicator may be employed to identify any slight deviation in angle, and the extent thereof, so that correction may be made, or subsequent reproduction employ the same off angle.

While the invention has been illustrated and described in connection with two embodiments, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A screen angle indicator for color lithograph screens, comprising a transparent sheet having an angle scale thereon, and means associated with said screen comprising a partially transparent region, said region being composed of a series of uniformly spaced opaque dots each of uniform area disposed in equally spaced parallel rows extending in two directions angularly disposed with respect to each other, the total area of said opaque dots being less than 50% of the partially transparent area and the spacing along said rows between dot centers being not greater than $\frac{1}{60}$ of an inch, and at least one of said rows of dots lying on a line extending substantially radial with respect to said scale.

2. A screen angle indicator for color lithograph screens, comprising a transparent sheet having an angle scale thereon, and means associated with said screen comprising a partially transparent region, said region being composed of a series of uniformly spaced opaque dots each of uniform area disposed in equally spaced parallel rows extending in two directions at right angles to each other, the total area of said opaque dots being less than 50% of the partially transparent region, and the spacing between dots along said parallel rows being uniform and one sixtieth of an inch or less, and at least one of said rows of dots lying on a line extending substantially radial with respect to said scale.

3. A screen angle indicator for color lithograph screens employing half tone dots, comprising a transparent sheet having an angle scale thereon, and means associated with said screen comprising a partially transparent region, said region being composed of a series of uniformly spaced opaque dots each of uniform area disposed in equally spaced parallel rows extending in two directions at right angles to each other, the total area of said opaque dots being less than 50% of the partially transparent region, and the spacing between dots along said parallel rows being uniform and corresponding to a standard color screen dot pattern, and at least one row of dots lying substantially on a line extending radial with respect to said scale.

4. A screen angle indicator for color lithograph screens, comprising a transparent sheet having an angle scale thereon, and means associated with said screen comprising a partially transparent region, said region being composed of a series of uniformly spaced opaque dots each of uniform area disposed in equally spaced parallel rows extending in two directions at angles to each other, the total area of said opaque dots being less than 50% of the partially transparent region, and the spacing between dots along said parallel rows being uniform and corresponding to a standard color screen dot pattern, and at least one row of said dots lying on a line extending substantially radial with respect to said scale.

5. A screen angle indicator for color lithograph screens, comprising a transparent sheet having an angle scale thereon, an opaque base line extending along a diameter of said scale, and a plurality of partially transparent regions each composed of uniformly spaced opaque dots each of uniform area disposed in equally spaced parallel rows extending in two directions angularly disposed with respect to each other, the total area of the opaque dots being less than 50% of the partially transparent regions, and the spacing between dot centers along said rows being uniform in all the partially transparent areas, and in correspondence with a standard color screen pattern, and at least one row of dots in each of said partially transparent regions extending substantially radially with respect to said scale, and at a 30 degree angle from a corresponding substantially radial row of one of said other partially transparent regions.

6. A screen angle indicator for color lithograph screens, comprising a transparent sheet having an angle scale thereon, an opaque base line extending along a diameter of said scale, and a plurality of partially transparent regions each composed of uniformly spaced opaque dots each of uniform area disposed in equally spaced parallel rows extending in two directions at right angles with respect to each other, the total area of the opaque dots being less than 50% of the partially transparent regions, and the spacing between dot centers along said rows being uniform in all the partially transparent regions, and at least one row of dots in each of said partially transparent regions extending substantially radially with respect to said scale, and at a 30 degree angle from a corresponding substantially radial row of one of said other partially transparent regions.

7. A screen angle indicator for color lithograph screens, comprising a transparent sheet having an angle scale thereon, an opaque base line extending along a diameter of said scale, and a plurality of partially transparent regions each composed of uniformly spaced opaque dots each of uniform area disposed in equally spaced parallel rows extending in two directions at right angles with respect to each other, the total area of the opaque dots being less than 50% of the partially transparent regions, and the spacing between dot centers along said rows being uniform in all the partially transparent regions, and at least one row of dots in each of three of said partially transparent regions extending substantially radially with respect to said scale, and at a 30 degree angle from a corresponding substantially radial row of dots of one of said other two partially transparent regions.

8. A screen angle indicator for color lithograph screens, comprising a transparent sheet having an angle scale thereon, an opaque base line extending along a diameter of said scale, and a plurality of partially transparent regions each composed of uniformly spaced opaque dots each of uniform area disposed in equally spaced parallel rows extending in two directions at right angles with respect to each other, the total area of the opaque dots being less than 50% of the partially transparent regions, and the spacing between dot centers along said rows being uniform in all the partially transparent regions, and at least one row of dots in each of three of said partially transparent regions extending substantially radially with respect to said scale, and at a 30 degree angle from a corresponding substantially radial row of dots of one of said other two partially transparent regions and a fourth region having at least one row of dots extending in a substantially radial row disposed at an angle of 15° from one of the said radial rows of one of said three regions.

References Cited in the file of this patent
UNITED STATES PATENTS

| | | |
|---|---|---|
| 2,253,107 | Brooks | Aug. 19, 1941 |
| 2,559,915 | Gaebel | July 10, 1951 |
| 2,703,281 | Consaul et al. | Mar. 1, 1955 |